3,353,916
QUANTITATIVE RECOVERY OF BROMINE BY TWO STAGE CATALYTIC OXIDATION OF HYDROGEN BROMIDE
George R. Lester, Park Ridge, Ill., assignor to Universal Oil Products Company, Des Plaines, Ill., a corporation of Delaware
No Drawing. Filed Apr. 25, 1966, Ser. No. 544,830
5 Claims. (Cl. 23—216)

This application is a continuation-in-part of a copending application Serial No. 364,765, filed May 4, 1964, now abandoned.

This invention relates to the recovery of bromine from hydrogen bromide, and in particular to a novel catalyst system for the quantitative conversion of hydrogen bromide to bromine.

Olefinic hydrocarbons are conveniently and economically prepared from more saturated hydrocarbons through the stepwise process of bromination and dehydrobromination, provided that bromine can be substantially completely recovered from the hydrogen bromide formed in the process. Hydrogen bromide can be suitably oxidized to bromine and water by continuous methods in the presence of oxidation catalysts described in the art, preferably a supported oxide or salt of copper. Supported oxides and salts of cerium, manganese, chromium, iron, nickel, cobalt, etc., are also utilized although conversions are somewhat less than are obtained with the preferred copper catalyst at substantially the same reaction conditions.

Each of the named catalysts, including the preferred copper catalysts, have inherent disadvantages with respect to hydrogen bromide oxidation. With copper catalysts, the problem relates to the volatility of copper bromide, utilized per se or formed during the course of the reaction, at reaction conditions. At temperatures in excess of about 350° C. the copper bromide volatilizes and migrates through the catalyst mass in the direction of flow with eventual loss of copper bromide and premature catalyst deactivation. The migration of copper bromide through the catalyst bed is evidenced by a moving, rather abrupt temperature peak which occurs in the temperature profile of the catalyst bed.

On the other hand, the other described catalysts are relatively stable in the presence of hydrogen bromide and oxygen at temperatures up to about 650° C. and more. In the oxidation of hydrogen bromide utilizing one of the other described catalysts, for example, cerium oxide, the oxidation proceeds readily at higher temperatures after a somewhat lengthy induction period provided that an excess of oxygen is present. However, as the reactants pass through the catalyst mass and the available oxygen approaches stoichiometric amounts, the conversion falls off and is not improved by further contact with the catalyst at the reduced oxygen level. While it might be presumed that sufficient oxygen could be added to insure complete oxidation, the advantage gained is more than off-set by difficulties encountered in the efficient recovery of bromine from a reaction mixture highly diluted wtih oxygen, air, or other gas.

It is a general object of this invention to present a novel process for the quantitative recovery of bromine from hydrogen bromide. It is a more specific object to present a novel process for the oxidation of hydrogen bromide to bromine whereby the oxidation reaction mixture is not unduly diluted with oxygen, air, or other oxygen-containing gas. It is a still more specific object to present a novel, stable catalyst system for effecting the quantitative recovery of bromine from hydrogen bromide over extended periods of operation.

In one of its broad aspects, this invention embodies a process for the quantitative recovery of bromine from hydrogen bromide which comprises admixing hydrogen bromide and an oxygen-containing gas and passing the same through a first oxidation zone of a dual zone oxidation system at a temperature of at least about 225° C. in contact with a catalyst selected from the group consisting of the oxides and salts of cerium, manganese, chromium, iron, nickel and cobalt, and converting a major portion of the hydrogen bromide to bromine, passing the first oxidation zone effluent containing residual hydrogen bromide through a second oxidation zone at a temperature of at least about 225° C. in contact wtih a catalyst selected from the group consisting of the oxides and salts of copper and converting the residual hydrogen bromide to bromine at reaction conditions to maintain a substantially immobile catalyst peak temperature not exceeding about 350° C.

One of the more specific embodiments of this invention is in a process for the quantitative recovery of bromine from hydrogen bromide which comprises admixing hydrogen bromide and air and passing the same through a first oxidation zone of a dual zone oxidation system at a temperature of from about 225° C. to about 600° C. in contact with a catalyst comprising zirconia containing from about 1% to about 30% cerium oxide composited therewith and converting a major portion of the hydrogen bromide to bromine, passing the first oxidation zone effluent containing residual hydrogen bromide through a second oxidation zone at a temperature of at least about 225° C. in contact with a catalyst comprising zirconia containing from about 1% to about 30% copper oxide composited therewith and converting the residual hydrogen bromide to bromine at reaction conditions to maintain a substantially immobile catalyst peak temperature not exceeding about 350° C.

Still another more specific embodiment relates to a process for the quantitative recovery of bromine from hydrogen bromide which comprises admixing hydrogen bromide and air in a mole ratio of from about 4:5 to about 2:3 and passing the same through a first oxidation zone of a dual zone oxidation system at a temperature of from about 225° C. to about 600° C. in contact with a catalyst comprising zirconia containing from about 1% to about 30% cerium oxide composited therewith and converting from about 85% to about 99% of the hydrogen bromide to bromine, passing the first oxidation zone effluent containing residual hydrogen bromide through a second oxidation zone at a temperature of at least about 225° C. in contact with a catalyst comprising zirconia containing from about 1% to about 30% copper oxide composited therewith and converting the residual hydrogen bromide to bromine at reaction conditions to maintain a substantially immobile catalyst peak temperature not exceeding about 350° C.

Other objects and embodiments will become apparent in the following more detailed description of the process of this invention.

Bromine is recovered from hydrogen bromide in accordance with the process of this invention by oxidation of the hydrogen bromide, the oxidizing agent being molecular oxygen or a molecular oxygen-containing gas which, for reasons of economy, is preferably air. The quantitative oxidation of hydrogen bromide to bromine and water requires one mole of oxygen per four moles of hydrogen bromide. It is desirable to utilize a minimum excess of oxidizing agent not exceeding about 20%. For example, where the oxidizing agent is air, a hydrogen bromide-air mole ratio of from about 4:5 to about 2:3 is preferred. While amounts in excess of about 20% of stoichiometric are operable, no particular advantage is realized therefrom, particularly in view of the added difficulty of recovering bromine from an oxidation reaction mixture overly diluted with oxygen, air or other oxygen-containing gas.

Pursuant to the present process, the mixture of hydrogen bromide and oxygen, or oxygen-containing gas as the case may be, is heated in contact with a catalyst, initially a catalyst selected from the group consisting of the oxides and salts of cerium, manganese, chromium, iron, nickel and cobalt, the oxide and the salts of cerium being preferred. The said catalysts, as well as the hereinafter described copper catalysts, are utilized supported on an adsorbent porous carrier material, preferably a synthetically prepared inorganic oxide like alumina, silica, zirconia, thoria, boria, magnesia, titania, zinc oxide, etc., or various combinations thereof such as silica-alumna, alumina-boria, zirconia-magnesia, and the like. The naturally occurring clays and silicates, for example, diatomaceous earth, often referred to as siliceous earth, diatomaceous silicate, etc., and fuller's earth, attapulgus clay, feldspar, montmorillonite, halloysite, etc., and also bauxite, gibbsite, diaspore, and the like, preferably activated by acid treatment or by other means, are suitably employed as carrier materials.

As aforesaid, the hydrogen bromide admixed with an oxidizing agent is heated in a first oxidation zone in contact with the described catalyst at a temperature of at least 225° C. A higher temperature, generally not exceeding about 650° C., is operable in the first oxidation zone although catalyst stability is more pronounced at a temperature of less than about 600° C. Thus, in a preferred embodiment, oxidation is effected in a first oxidation zone at a temperature of from about 225° C. to about 600° C.

A gaseous hourly space velocity (GHSV) of from about 500 to about 3000 may be suitably employed with the air-hydrogen bromide ratios herein described. However, it is not intended to limit the process of this invention to any particular gaseous hourly space velocity and any suitable space velocity may be employed in the dual zone system provided that the temperature limitation, particularly in the second oxidation zone, herein described are not exceeded by reason thereof.

The major portion of the hydrogen bromide, and preferably from about 85% to about 99%, is converted to bromine in contact with the relatively stable catalyst disposed in the first oxidation zone. The hydrogen bromide oxidation reaction mixture effluent from the first oxidation zone, including unreacted hydrogen bromide and air or other oxidizing agent, is passed through a second oxidation zone in contact with a copper catalyst at a temperature of at least about 225° C., the copper catalyst being selected from the group consisting of the oxides and salts of copper deposited on a support or carrier material as in the case of the catalyst utilized in the first reaction zone.

The catalysts utilized in accordance with the process of this invention may be prepared by any conventional or otherwise convenient method. For example, the selected support or carrier material can be soaked, dipped, or otherwise immersed in an aqueous solution of a soluble salt of copper such as cupric sulfate, cupric salicylate, etc., in the case of a copper catalyst, or, in the case of the other described catalysts, an aqueous solution of a soluble salt thereof, for example cerous chloride, cerous iodide, cerous nitrate, manganous acetate, manganous formate, manganous nitrate, manganous sulfate, chromic acetate, chromic nitrate, chromic sulfate, ferrous acetate, ferric bromide, ferric nitrate, ferrous sulfate, nickel acetate, nickel formate, nickel nitrate, nickel sulfate, cobaltous acetate, cobaltous benzoate, cobaltous nitrate, cobaltous sulfate, etc. In either case, the concentration of the impregnating solution should be such as to insure a final catalyst composite comprising at least about 1 wt. percent of the desired catalytic component and not necessarily exceeding about 30 wt. percent thereof. The support or carrier material is immersed as described for a suitable period of time during which excess water is evaporated therefrom, or after which excess solution is decanted therefrom. The foregoing procedure may be repeated one or more times, with or without intermediate drying, to achieve the desired catalyst composite. The catalyst is preferably utilized in a particulate form which may be granular or shaped particles of definite size and shape. The carrier or supporting material is usually prepared in the desired particulate form prior to combination with the catalytic element. Particles of definite size and shape may be prepared by commingling a powdered form of the support or carrier material with a suitable pelleting agent including hydrogenated vegetable oils, graphite, etc., and compressing the same into pellets. The catalytic composite may also be formed into the desired shape by extrusion methods, or utilized as granules of varied size and shape. Regardless of the method of compositing the catalytic element with the support or carrier material, the resulting composite is dried, usually at a temperature of from about 95° C. to about 200° C., and preferably calcined. The composite is suitably calcined at a temperature of from about 400° C. to about 800° C., and preferably at a temperature of from about 500° C. to 700° C. Calcination can be effected in any suitable atmosphere. Usually calcination is effected in the presence of air or other oxidizing media to form the catalyst in an oxide form, although in some cases calcination may be effected in an inert atmosphere such as nitrogen.

The process of this invention comprises a first oxidation zone and a second oxidation zone. The dual oxidation zones may be located in separate reactors or they may be located within a single reactor separated by suitable heat exchange means to maintain reaction temperatures within the prescribed limits. One suitable method of effecting the present invention comprises preheating the hydrogen bromide charge and passing the same into the first oxidation zone containing a mass or fluidized bed of catalyst, preferably a supported cerium catalyst. Oxygen, generally in the form of air containing the same, is charged to the first oxidation zone, either in a separate stream or commingled with the hydrogen bromide charge, to convert at least a major portion of the hydrogen bromide at a temperature of at least about 225° C. The resulting hydrogen bromide oxidation reaction mixture is passed through heat exchange means to the second oxidation zone containing a mass or fluidized bed of a supported copper catalyst to convert the residual hydrogen bromide to bromine at a temperature of at least 225° C. and at reaction conditions to maintain a substantially immobile catalyst peak temperature not exceeding about 350° C. The effluent from the second oxidation zone is cooled to about room temperature and bromine distilled from the condensable product.

Te following examples are presented in illustration of the process of this invention It is not intended that said examples shall act as an undue limitation on the generally broad scope of this invention as set out in the appended claims.

Example I

This example is presented in illustration of the tendency of a copper catalyst to migrate through a catalyst bed with eventual loss by vaporization. A catalyst was prepared in the following manner:

A solution consisting of 68 grams of $Cu(NO_3)_2 \cdot 3H_2O$ (cupric nitrate) in 0.1 liter of water, and a solution consisting of 1801 grams of $ZrOCl_2 \cdot 8H_2O$ (zirconyl chloride 36.6% $ZrO_2$) in 2 liters of water were mixed together and poured slowly and the stirring into 7.2 liters of 3 N NaOH. The precipitate was filtered as dry as possible on Buchner vacuum funnels and then charged to a washing tower. Hot water at 8 gallons per hour and 3 N NaOH at 300 cubic centimeters per hour were admixed and flushed over the precipitate for a period of 20 hours. The washed precipitate was dried for about 70 hours at 120° C. and calcined for 2 hours at 600° C. The calcined material was ground to 10–30 mesh and utilized as a catalyst. By analysis it contained 2.5% copper. The catalyst thus prepared was placed in a vertical stainless steel reactor interspersed between two beds of 1/16" α-alumina spheres. Forty-nine cubic centimeters (40.4 gms.) of the alumina spheres were placed in a fixed bed 3⅞" in depth. Immediately above the bed was placed 47.0 cubic centimeters (32.1 gms.) of the catalyst. The catalyst bed was 4" in depth. The second alumina bed (47.0 cc.–33.7 gms.) was placed immediately above the catalyst bed and was 4⅛" in depth. The reactor, together with a preheater coil, was immersed in a fused sodium aluminum chloride bath heated at about 325° C. Air and hydrogen bromide were charged upflow to the reactor in a 3:2 mole ratio at a gaseous hourly space velocity of about 1000. The catalyst bed temperature profile was recorded hourly over a 132-hour period by means of a sliding thermocouple. The catalyst bed temperature profile exhibited a very sharp peak close to the inlet. From the catalyst bed temperature profile the reaction appeared to be virtually completed in ¼" of bed depth. The catalyst bed temperature profile exhibited a sharp peak which shifted upwardly with time, a change of ½" being recorded over the 132-hour period. In this time the peak temperature varied between 398° C. and 416° C. except for a relatively brief period of about 2 hours when the bath temperature was lowered to 250° C. In the latter instance the peak temperature was 352° C. At the conclusion of the run, the reactor was dissected in order to examine the catalyst bed intact. The catalyst particles upstream of the final catalyst bed peak temperature had assumed a yellow color changing to orange and then to light green as the catalyst particles approached the final catalyst bed peak temperature position ¾" from the bed inlet. The catalyst particles were separated and analyzed for copper. Those particles predominantly yellow in color were found to contain only 0.8% copper. The predominantly orange particles contained about 1.1% copper, and the light green particles about 23%. The post peak particles were initially dark green in color changing to black. The dark green particles contained about 12% copper while the black particles contain as much a 31%. The reactor walls situated downstream of the catalyst bed contained deposits of bluish-green material judged to be cupric bromide. The gradual migration of the sharp temperature peak in the catalyst bed temperature profile, coupled with the loss of copper from the catalyst particles upstream of the peak and accumulation of copper in the particles at and downstream of the temperature peak illustrates that copper bromide, utilized per se or formed during the course of the reaction, is volatilized and migrates through the catalyst mass is the direction of flow with eventual loss of copper and premature catalyst deactivation.

*Example II*

Hydrogen bromide admixed with air in a mole ratio of about 2:3 is charged to a preheater coil at a GHSV of approximately 1000. The reactants are charged through the preheater coil which is immersed in a heated sodium-aluminum chloride solution and preheated therein to a temperature of about 225° C. The preheated charge is passed to a first oxidation reaction zone located in a ¾" I.D. stainless steel vertical tubular reactor and containing 100 cubic centimeters of catalyst disposed in a fixed bed therein. The catalyst of this first oxidation reaction zone comprises 20–30 mesh zirconia containing about 10% cerium oxide deposited thereon. The stability of the catalyst is evidenced by a temperature peak of about 455° C. which occurs in the temperature profile of the catalyst bed about ¼" below the inlet and does not migrate during the entire course of the oxidation re-action. Hydrogen bromide conversion in the first oxidation reaction zone is 88% after 3 hours on stream, rising to 99% after 35 hours on stream. Conversion is maintained at this level until the run is terminated after 214 hours on stream. The effluent reaction mixture from the first oxidation reaction zone is continuously recovered and passed through a heat exchange means to a second oxidation reaction zone at a temperature of about 225° C., said reaction zone being located in a ¾" I.D. stainless steel vertical tubular reactor and containing 100 cubic centimeters of catalyst dispersed in a fixed bed therein. The catalyst comprises 20–30 mesh zirconia containing about 3% copper oxide deposited thereon. The temperature profile of the catalyst bed shows a temperature peak not exceeding about 350° C. fixed in a position about ¼" below the inlet through the course of the oxidation. The reactor effluent is recovered through a series of wet ice condensers and bromine separated from the condensate by distillation methods.

I claim as my invention:

1. A process for the quantitative recovery of bromine from hydrogen bromide which comprises admixing hydrogen bromide and an oxygen-containing gas and passing the same through a first oxidation zone of a dual zone oxidation system at a temperature of at least about 225° C. in contact with a catalyst selected from the group consisting of the oxides and salts of cerium, manganese, chromium, iron, nickel and cobalt and converting a major portion of said hydrogen bromide to bromine, passing the first oxidation zone effluent containing residual hydrogen bromide through the second oxidation zone in contact with a copper oxide catalyst and converting the residual hydrogen bromide to bromine at reaction conditions to maintain in said second zone a temperature of from about 225° C. to about 350° C. and a temperature profile characterized by a substantially immobile catalyst peak temperature not exceeding about 350° C.

2. The process of claim 1 further characterized in that said catalyst of said first oxidation zone is cerium oxide.

3. The process of claim 2 further characterized in that said oxygen-containing gas is air, and further characterized in that said catalyst of said first oxidation zone comprises zirconia containing from about 1% to about 30% cerium oxide composited therewith, and still further characterized in that said catalyst of said second oxidation zone comprises zirconia containing from about 1% to about 30% copper oxide composited therewith.

4. The process of claim 3 further characterized in that said hydrogen bromide and air are admixed in a mole ratio of from about 4:5 to about 2:3, and further characterized in that said temperature in said first oxidation zone is from about 225° C. to about 600° C.

5. The process of claim 4 further characterized in that said major portion of hydrogen bromide converted in said first oxidation zone is about 85% to about 99% of the hydrogen bromide charged thereto.

References Cited

UNITED STATES PATENTS

| 2,163,877 | 6/1939 | Hooker | 23—216 |
| 2,204,733 | 6/1940 | Miller | 23—219 |
| 2,418,931 | 4/1947 | Gorin | 23—219 |
| 2,536,457 | 1/1951 | Mugdan | 23—216 |
| 2,746,844 | 5/1956 | Johnson et al. | 23—219 |

FOREIGN PATENTS

| 930,341 | 7/1963 | Great Britain. |

OSCAR R. VERTIZ, *Primary Examiner.*

EDWARD STERN, *Examiner.*